US012304876B2

(12) United States Patent
Stokka et al.

(10) Patent No.: US 12,304,876 B2
(45) Date of Patent: May 20, 2025

(54) METHOD FOR GRANULATING A MELT OF AN HYDROUS NITRATE MINERAL SALT-BASED COMPOSITION, SYSTEM AND USE THEREOF

(71) Applicant: YARA INTERNATIONAL ASA, Oslo (NO)

(72) Inventors: Per Stokka, Porsgrunn (NO); Olav Kjøhl

(73) Assignee: YARA INTERNATIONAL ASA, Oslo (NO)

( * ) Notice: Subject to any disclaimer, the term of this patent is extended or adjusted under 35 U.S.C. 154(b) by 1037 days.

(21) Appl. No.: 17/295,143

(22) PCT Filed: Nov. 22, 2019

(86) PCT No.: PCT/EP2019/082188
§ 371 (c)(1),
(2) Date: May 19, 2021

(87) PCT Pub. No.: WO2020/104637
PCT Pub. Date: May 28, 2020

(65) Prior Publication Data
US 2022/0017427 A1    Jan. 20, 2022

(30) Foreign Application Priority Data
Nov. 22, 2018    (EP) .................................... 18207816

(51) Int. Cl.
*C05C 1/02*     (2006.01)
*B01J 2/00*     (2006.01)
(Continued)

(52) U.S. Cl.
CPC .................................... *C05C 1/02* (2013.01);
*B01J 2/00* (2013.01); *B01J 2/14* (2013.01);
*C05C 5/005* (2013.01); *C05C 5/04* (2013.01);
*C05G 5/12* (2020.02)

(58) Field of Classification Search
CPC .. C05C 1/02; C05C 5/005; C05C 5/04; C05G 5/12; B01J 2/00; B01J 2/14
See application file for complete search history.

(56) References Cited

U.S. PATENT DOCUMENTS

| 3,379,496 A | 4/1968 | Russo |
| 4,008,064 A | 2/1977 | Skauli |
| (Continued) |

FOREIGN PATENT DOCUMENTS

| CN | 1167650 A | 12/1997 |
| CN | 106414372 A | 2/2017 |
| (Continued) |

OTHER PUBLICATIONS

Chinese Office Action (including English translation) issued in App. No. CN201980069674.8, dated Aug. 9, 2022, 15 pages.
(Continued)

*Primary Examiner* — Wayne A Langel
(74) *Attorney, Agent, or Firm* — Dilworth IP, LLC

(57) ABSTRACT

The present disclosure relates to a method for controlling the temperature in a granulator in which a melt of an hydrous nitrate mineral salt-based composition is granulated. The method comprises the steps of granulating the melt, separating out the undersized and oversized particles at the outlet of the granulator and recycling the undersized and oversized particles to the granulator, measuring the temperature in the granulator, adjusting the amounts of undersized and oversized particles recycled to the granulator according to the measured temperature in the granulator. The present disclosure further relates to low dust producing uncoated granules of a hydrous nitrate mineral salt-based composition.

12 Claims, 6 Drawing Sheets

(51) Int. Cl.
  *B01J 2/14*   (2006.01)
  *C05C 5/00*   (2006.01)
  *C05C 5/04*   (2006.01)
  *C05G 5/12*   (2020.01)

(56) References Cited

U.S. PATENT DOCUMENTS

| | | |
|---|---|---|
| 4,316,736 A | 2/1982 | Van Hijfte |
| 4,743,289 A | 5/1988 | Mickus |
| 6,013,209 A | 1/2000 | Phinney |
| 2008/0200561 A1 | 8/2008 | Wirth |
| 2013/0192323 A1 | 8/2013 | Barthe |

FOREIGN PATENT DOCUMENTS

| | | | |
|---|---|---|---|
| EP | 0068573 A1 | 1/1983 | |
| EP | 0212714 A1 | 3/1987 | |
| EP | 0610740 | 8/1994 | |
| EP | 3366658 A1 * | 8/2018 | ............ C05B 1/00 |
| FR | 2451351 B1 | 3/1983 | |
| GB | 796861 A | 6/1958 | |
| GB | 810469 A | 3/1959 | |
| GB | 1024558 | 3/1966 | |
| GB | 1069454 A | 5/1967 | |
| IN | 201941016361 | 10/2020 | |
| WO | 9739826 A1 | 10/1997 | |
| WO | 200447976 A1 | 6/2004 | |
| WO | 2006029718 | 3/2006 | |
| WO | WO-2017068039 A1 * | 4/2017 | ............ C05C 1/02 |

OTHER PUBLICATIONS

International Search Report and Written Opinion from PCT/EP2019/082188; dated Feb. 13, 2020; 15 pages.
International Preliminary Report on Patentability from PCT/EP2019/082188; dated Dec. 9, 2020, 13 pages.
English translation of Colombian Office Action issued in App. No. NC2021/0006345, dated Feb. 23, 2024, 8 pages.

* cited by examiner

METHOD FOR GRANULATING A MELT OF AN HYDROUS NITRATE MINERAL SALT-BASED COMPOSITION, SYSTEM AND USE THEREOF

FIELD OF THE INVENTION

The present disclosure relates to the field of granulation of a melt of an hydrous nitrate mineral salt-based composition, more in particular to the control of the temperature in the granulator in which such a melt is granulated.

BACKGROUND

Nitrate mineral salts comprising the primary mineral nutrients for plants based on nitrogen (N), phosphorus (P) and potassium (K) are well known for their use as fertilizers. The primary nutrients are mainly absorbed by plants in the form of ions, such as $NO_3^-$, $NH_4^+$, $HPO_4^{2-}$, $H_2PO_4^-$ and $K^+$. Accordingly, most inorganic fertilizers provide salts comprising some or all of the mentioned ions.

The production of solid fertilizers comprising nitrate mineral salts comprises a step of granulating a melt of the nitrate mineral salts. The state of the art technology for granulating includes for example prilling, fluidized bed granulation, spherodizer granulation, pan granulation, drum granulation and blunger or pug-mill granulation.

In particular, granules are formed through the agglomeration principle. Granulation according to the agglomeration principle is defined as the process during which a powder is in contact with a liquid binder, thereby causing the wet powder particles to become cohesive and agglomeration to occur during particle collisions, as the binder sets to form mechanically stable granules. Pan granulators, blungers and drum granulators for example operate according to the agglomeration principle.

A necessary characteristic of the granules as suitable commercial fertilizers is that they possess a round shape. Such round shape is difficulty achieved if the amount of water in the granulator is not controlled. In situations in which the amount of water in the liquid phase is too high, over-agglomeration and the formation of oversized granules will occur and this phenomenon is referred to as wet granulation. In situations in which there is not enough liquid in the granulator, formation of porous and uneven granules will occur and this phenomenon is referred to as dry granulation.

The water content cannot be measured precisely inside the granulator. Only in the final granular product can the moisture content be accurately measured. In addition, the required amount of liquid to avoid both dry and wet granulation is difficult to calculate, considering that information on many unknown process parameters is required for such calculations.

It is an object of the present disclosure to provide a method for granulating a melt of an hydrous nitrate mineral salt-based composition for the production of granules with a round shape and producing minimum amounts of dust. This is done by controlling the percentage of liquid phase inside the granulator.

PRIOR ART

WO 2004/047976 A1 (Omnia Fertilizer Ltd, 2004) discloses an apparatus for producing calcium nitrate granules comprising a first fluidized bed for granulation of a calcium nitrate melt, and a second fluidized bed as primary cooler. The granules so produced are hard and dry and do not break down easily during handling. It is indicated that the primary cooler has an inspection window through which the granules can be observed. An operator can see from the size of granules passing through the primary cooler whether the apparatus is operating correctly.

U.S. Pat. No. 4,008,064 A1 (Norsk Hydro, 1977) discloses a pan granulation process for the production of low-water or substantially anhydrous nitrogenous compounds with an appreciably higher specific output and production capacity than have earlier been achieved. The method is simple and reliable, charging of solids and melt is conducted in such a way and by use of such conditions that there is maintained a high-temperature zone in the surface of the bed in that region of the pan where the largest particles are concentrated, whereby there are formed finished granulated particles, having a dense structure and high strength. This teaching is not concerned with the production of granules from a melt of an hydrous nitrate mineral salt-based composition having a round shape and producing minimum amounts of dust.

EP 0068573 A1 (Unie van Kunstmestfabrieken B.V., 1983) discloses a process for obtaining an ammonium nitrate product that has high thermal stability and bulk density, and, on the other hand, has an extremely low moisture content and excellent impact and crushing resistance, hardly cakes and is hardly hygroscopic. A particular advantage is that the product is obtained over a very wide bed-temperature range. According to the invention, this is achieved in that an ammonium nitrate-containing melt including at most 5% wt. water and 0.5-5% wt., relative to the quantity of ammonium nitrate, of finely divided a material which contains silica and is insoluble in and chemically inert relative to ammonium nitrate, is sprayed into or onto a fluidized bed of ammonium nitrate-containing seed particles having a temperature of between 95 and 145° C., and the granules formed are discharged from the bed. This teaching is not concerned with the production of granules from a melt of an hydrous nitrate mineral salt-based composition having a round shape and producing minimum amounts of dust.

None of the prior art methods is disclosed for the production of an hydrous nitrate mineral salt-based composition by controlling the percentage of liquid phase inside the granulator. The prior art does not suggest the use of an automatically measurable and reliable parameter that can be used for controlling the roundness of the granules obtained from a granulator in which a hydrous nitrate mineral salt-based composition is granulated. Therefore, there remains a need for such automatically measurable and reliable parameter for granulating such hydrous nitrate mineral salt-based composition.

SUMMARY

According to one aspect of the present disclosure, a method is disclosed for granulating a melt of an hydrous nitrate mineral salt-based composition. The method comprises the steps of:
a) granulating a melt of the nitrate mineral salt-based composition by a granulator operating according to the agglomeration granulation principle to obtain a set of granules;
b) separating out oversized and undersized granules from the granules obtained from step a) to obtain at least a set of oversized granules,
a set of undersized granules and a set of granules having a suitable size;

c) crushing the oversized granules obtained from step b);
d) recycling the granules obtained from step c) to the granulator;
e) recycling the undersized granules obtained from step b) to the granulator;
f) during step a) measuring a temperature in the granulator and
g) based on the temperature measured in step f), adjusting the amounts of granules recycled in steps d) and/or e) to maintain the temperature measured in step f) with in a certain range and;

The advantage of using the temperature as a control parameter in the granulation method of a melt of the hydrous nitrate mineral salt-based composition is that it is an easy and reliable parameter to measure. It has been found that controlling the temperature can be used for controlling the roundness of the granules produced by the granulation method, which results in the production of granules producing less dust. It has further been found that the temperature can be controlled by controlling the amounts of granules recycled to the granulator, such recycling being also easily and reliably controllable.

According to an embodiment of the method of the disclosure, the method further comprises the step h) of coating the granules obtained from the set of granules of suitable size obtained in b) with a coating that prevents or reduces moisture up-take. Any coating agent suitable for preventing or reducing moisture uptake is suitable.

According to one embodiment of the method of the disclosure, the hydrous nitrate mineral salt is calcium ammonium nitrate.

According to one embodiment of the method of the disclosure, the hydrous nitrate mineral salt is calcium nitrate.

According to one embodiment of the method of the disclosure, the granulator is a pan granulator.

According to one embodiment of the method of the disclosure, the temperature is measured by an infrared thermometer.

According to one embodiment of the method of the disclosure, the temperature is measured online.

According to one embodiment of the method of the application, the temperature measured in step f) ranges from 90 to 96° C., in particular from 92 to 95° C., when the nitrate mineral salt is calcium nitrate.

According to one embodiment of the method of the disclosure, the oversized granules have a sieve diameter that is larger than 4 mm.

According to one embodiment of the method of the disclosure, the undersized granules have a sieve diameter that is smaller than 2 mm.

According to one embodiment of the method of the disclosure, the granules having a suitable size have a sieve diameter ranging from 2 mm to 4 mm.

According to another aspect of the disclosure, granules produced by the method according to the invention are disclosed.

According to another aspect of the disclosure, uncoated granules having a sieve diameter ranging from 2 mm to 4 mm, comprising an hydrous nitrate mineral salt-based composition, characterized in that they produce less than 1000 mg of dust per kg of granules, in particular less than 350 mg of dust per kg of granules, according to the Yara YTC-LAB-132 method described in the examples, are disclosed.

DETAILED DESCRIPTION

Figure 1:
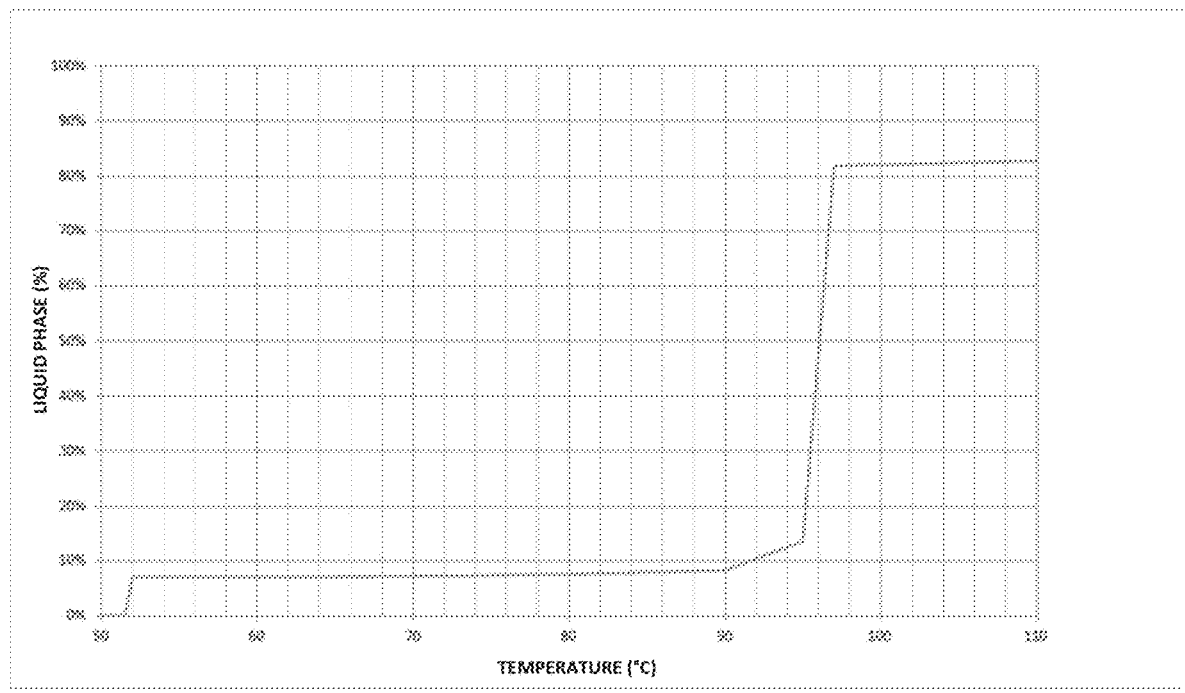
FIG. 1 shows the variation of the water content as a function of the temperature in the granulation of calcium nitrate.

Throughout the description and claims of this specification, the words "comprise" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

The enumeration of numeric values by means of ranges of figures comprises all values and fractions in these ranges, as well as the cited end points. The term "ranges from . . . to" as used when referring to a range for a measurable value, such as a parameter, an amount, a time period, and the like, is intended to include the limits associated to the range that is disclosed.

The term "approximately" as used when referring to a measurable value, such as a parameter, an amount, a time period, and the like, is intended to include variations of +/10% or less, preferably +/−5% or less, more preferably +/−1% or less, and still more preferably +/−0.1% or less, of and from the specified value, in so far as the variations apply to the invention disclosed herein. It should be understood that the value to which the term "approximately" refers per se has also been disclosed.

All references cited in this description are hereby deemed to be incorporated in their entirety by way of reference.

A calcium nitrate salt-based mixture can be produced by the Odda nitrophosphate process by crystallizing, upon cooling down to a temperature range from −5° C. to −20° C., a melt of digested phosphate rock, such as apatite, in nitric acid. The crystallized calcium nitrate is subsequently filtered and processed into a melt that is neutralized by the addition of ammonia, in order to precipitate the impurities, in particular fluoride salts. The impurities precipitated during the neutralization are separated from the neutralized solution through lamella separators. The resulting calcium nitrate-based melt is then evaporated in order to produce a concentrated melt of a calcium-nitrate based salt composition. This concentrated melt has a temperature ranging from 100 to 150° C. More generally, prior to producing any melt of a nitrate mineral salt-based composition that is suitable for granulation, meaning that has a suitable water content, an evaporation step is required. In particular, the water content in the evaporation step for the production of melt of a calcium nitrate salt-based composition is reduced to between 14 and 17%. This evaporation step confers to the melt to be granulated, in a subsequent granulation step, a temperature ranging from 100 to 150° C.

The inventors have now realized that granulation of an hydrous nitrate mineral salt-based compositions can be performed according to the method of claim 1. As defined herein, an hydrous nitrate mineral salt-based composition is a mineral salt-based composition comprising from 15 to 30 weight % of water. When the method of the disclosure is applied for granulating a melt of a calcium nitrate salt-based composition, the temperature in the granulator ranges from 90 to 96° C., in particular from 92 to 95° C., by adjusting the recycled amounts to the granulator of undersized granules and of oversized granules following a crushing step. As a result, the produced granules are of higher quality: the granules show a round shape and produce low quantities of dust.

According to an aspect of the disclosure, a method is disclosed for granulating a melt of an hydrous nitrate mineral salt-based composition. In step a) of the method, the melt of the hydrous nitrate mineral salt-based composition is granulated by a granulator operating according to the agglomeration granulation principle which produces a set of granules.

As defined herein, an hydrous nitrate mineral salt-based composition is defined as comprising at least 60 weight % of the hydrous nitrate mineral salt. For example, a calcium nitrate mineral salt-based composition is defined as a composition comprising from 60 to 80 weight % of calcium nitrate and less than 10 weight % of ammonium nitrate.

As defined herein, granulation according the agglomeration principle is defined as the process during which a powder is in contact with a liquid binder, thereby causing the wet powder particles to become cohesive and agglomeration to occur during particle collisions, as the binder sets to form mechanically stable granules.

In step b) of the method the oversized and undersized granules are separated out from the granules obtained from step a) which produces at least a set of oversized granules, a set of undersized granules and a set of granules having a suitable size.

Within the context of the disclosure, oversized and undersized granules are respectively defined as granules that have a sieve diameter larger than 4 mm and smaller than 2 mm. Within the context of the disclosure, granules having a suitable size have a sieve diameter ranging from 2 mm to 4 mm. Within the context of the disclosure, a sieve diameter is defined as the width of the minimum square aperture through which the particle will pass. A common sizing device associated with this definition is a series of sieves with square woven meshes.

In step c) of the method, the oversized granules obtained from step b) are crushed. In step d) of the method, the granules obtained from step d) are recycled to the granulator. In step e) of the method, the undersized granules obtained from step a) are recycled to the granulator. In step f) of the method, the temperature is measured in the granulator. According to one embodiment of the disclosure steps d) and e) occur simultaneously.

In step g) of the method, the amounts of granules recycled in steps c) and e) are adjusted based on the temperature measured in step f). Such adjustment can be performed by adjusting the amounts of granules recycled in one or both recycling loops. Within each recycling loop, the amounts of granules being recycled can be adjusted by either:
i. adjusting the opening of a valve;
ii. or adjusting a valve within the loop and located between the entrance of the loop and the granulator, for recycling granules to the entrance of the recycling loop;
iii. or a combination of both i. and ii.

According to an embodiment of the method of the disclosure, the method further comprises the step h) of coating the granules obtained from the set of granules of suitable size obtained in b) with a coating that prevents or reduces moisture up-take. Any coating agent suitable for preventing or reducing moisture uptake is suitable.

It has been found that keeping the temperature constant is essential for granulating compositions such as calcium nitrate-based compositions that have a well-defined granulation curve when granulated according to the agglomeration principle. Without being bound by the theory, the importance of keeping the temperature constant can, therefore, be considered essential for granulating a melt of any hydrous nitrate mineral salt-based composition according to the agglomeration principle, in order to produce round particles from which the amount of dust produced is minimized.

According to one embodiment of the method of the disclosure, the nitrate mineral is calcium ammonium nitrate.

According to one embodiment of the method of the disclosure, the nitrate mineral salt is calcium nitrate.

Without being bound by theory, at a controlled temperature, the amount of the liquid phase in the granulator will be controlled and optimal. Therefore, neither wet granulation nor dry granulation will occur. Wet granulation is defined herein as over-agglomeration and the formation of oversized granules when the liquid phase is too important. Dry granulation is defined herein as the formation of porous and uneven granules when there is not enough liquid in the granulator.

It has further been found that the temperature in the granulator can be kept constant by controlling the recycling ratio of both undersized and oversized granules.

Without being bound by theory, the temperature of the undersized particles and in the oversized particles after crushing that are recycled to the granulator influence the temperature and, hence, the content of the liquid phase in the granulator. By ensuring that the temperature remains constant and the recycled flows are adjusted accordingly, the amount of liquid remains constant which results in wet granulation and dry granulation being prevented.

According to one embodiment of the method of the disclosure, the granulator used for performing the method is a pan granulator. As defined herein, a pan granulator is defined as a pan that allows particles to be set in motion by the tumbling action caused by the balance between gravity and centrifugal forces.

According to one embodiment of the disclosure, the temperature is measured by an infrared thermometer. Using an infrared thermometer offers the advantages offered by non-contact temperature measurements. One of those advantages is the speed of measurement which allows for more measurements, the accumulation of more data and the possibility to determine temperature areas. Furthermore, an infrared contactless thermometer facilitates the measurement of moving targets, such as granules flows in a granulator. A further advantage is that there is no energy loss from the target, therefore no interference which results in extremely accurate measurements with no distortion of measured values, as compared to measurements with contact thermometers. Non-contact infrared temperature measurement is also wear-free: there is no risk of contamination and no mechanical effect on the surface of the granules in the granulator such that the granules will not be scratched and their surface can be measured.

According to one embodiment of the method of the disclosure, the temperature is measured online. An advantage of measuring online is that the frequency of measurements can be chosen according to the capacity of the infrared thermometer and, shall, in any case, be more frequent than if off-lines measurements are performed. This will generate more temperature data and allow more frequent adjustment of the recycled flows. Therefore, through temperature measurement, the disclosure provides a reliable parameter, automatically measured and that can be used for adjusting the recycled flows.

According to one embodiment of the method of the disclosure, the temperature measured in step f) ranges from 90 to 96° C., in particular from 92 to 95° C., when a melt of a calcium nitrate mineral salt-based composition is granulated.

According to another aspect of the application, granules produced by the method according the application are disclosed.

According to another aspect of the disclosure, uncoated granules of an hydrous nitrate mineral salt-based composition, having a sieve diameter ranging from 2 mm to 4 mm, are disclosed that produce less than 1000 mg of dust per kg of granules, in particular less than 350 mg per kg of granules, according to the Yara YTC-LAB-132 method described below. As defined herein, uncoated means that the particles according to the application are not coated with any product, meaning that no additional product is added on the surface of the particles, following the granulation step.

It has indeed been found that from the method according to the disclosure, the granules produced have a round shape which results in less dust production.

EXAMPLES

Example 1: Importance of Control of the Temperature

Reference is made to FIG. 1. The variation of the percentage of the liquid phase in a melt of a calcium nitrate mineral salt-based composition as a function of the temperature was investigated. The composition comprised from 75 to 78% calcium nitrate, from 6 to 10% ammonium nitrate and from 14 to 17% water. As can be clearly seen from the curve, a change of the temperature from 94° C. to just 97° C. results in an increase in the liquid phase from less than 15% to 82%. If the temperature is below 94° C., dry granulation will occur. If the temperature is above 97° C., wet granulation will occur. Consequently, it is clear that the temperature must be very accurately controlled in order to control the amount of liquid in the granulator and, thereby, the granulation process by avoiding wet granulation, and also dry granulation at temperatures below 52° C.

Example 2

Figure 2:
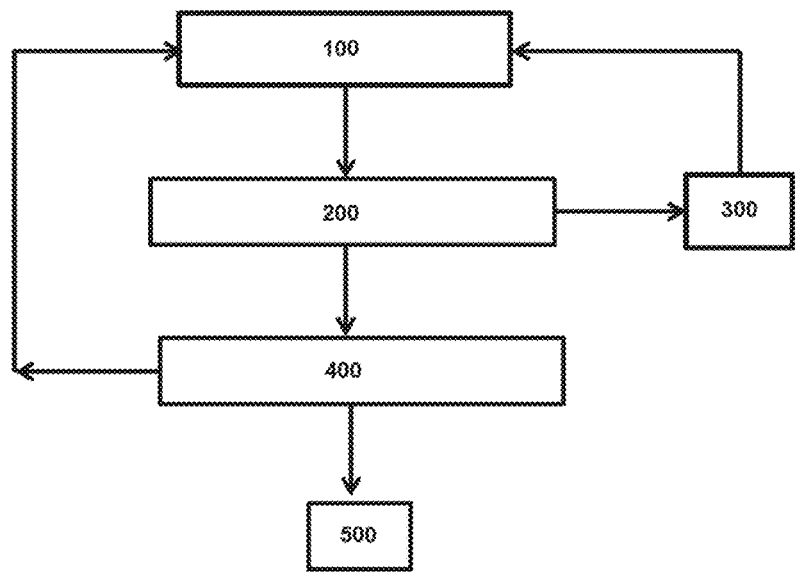
FIG. 2 shows a schematic representation of the method of the disclosure that does not incorporate a recycling silo.

Reference is made to FIG. 2. A melt of a calcium nitrate mineral salt-based composition was granulated by a granulator (100) operating according to the agglomeration granulation principle, at a temperature between 90 and 95° C., as measured online by an Ircon Model 4 infrared thermometer capable of measuring temperatures ranging from 0 to 100° C., throughout the process. The granules at the outlet of granulator (100) were subsequently sent to the separator of oversized particles (200). The granules separated out by the separator of oversized particles (200), with a sieve diameter larger than 4 mm, were sent to the crusher (300) for crushing. The granules that were not separated out by the separator of oversized particles (200), with a sieve diameter smaller than 4 mm, were sent to the separator of undersized particles (400). The particles that were not separated out by the separator of undersized particles (400), with a sieve diameter larger than 2 mm, were sent to the product silo (500). Granules crushed by crusher (300) and granules separated out by the separator of undersized particles (400) were recycled to the granulator (100) in amounts such that the temperature was maintained between 90 and 95° C. in the granulator (100).

Example 3

Figure 3:
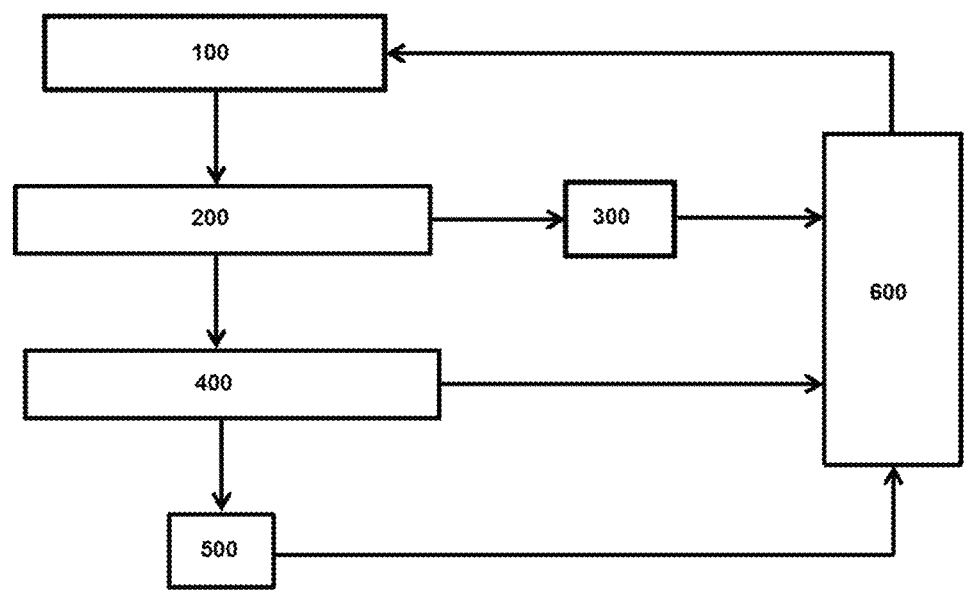
FIG. 3 shows a schematic representation of the method of the disclosure that does incorporate a recycling silo (600).
Figure 4:
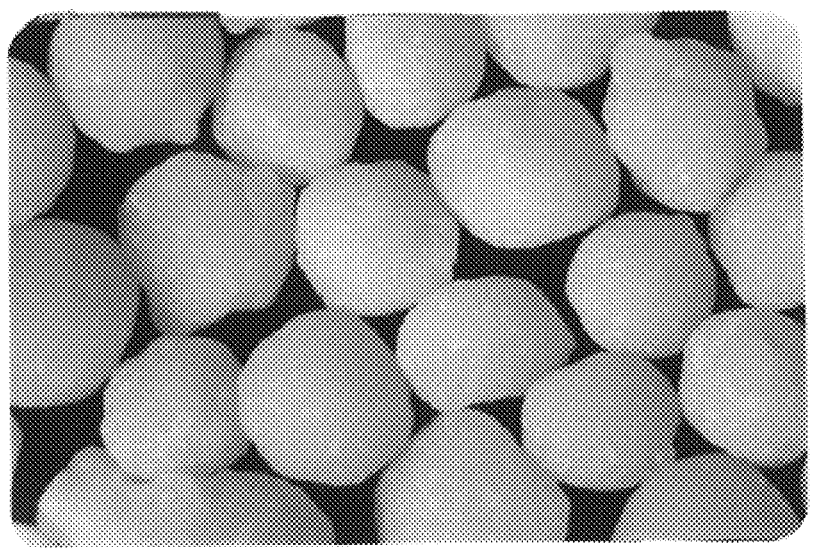
FIG. 4 shows granules producing less than 350 mg of dust per kg of granules
Figure 5:
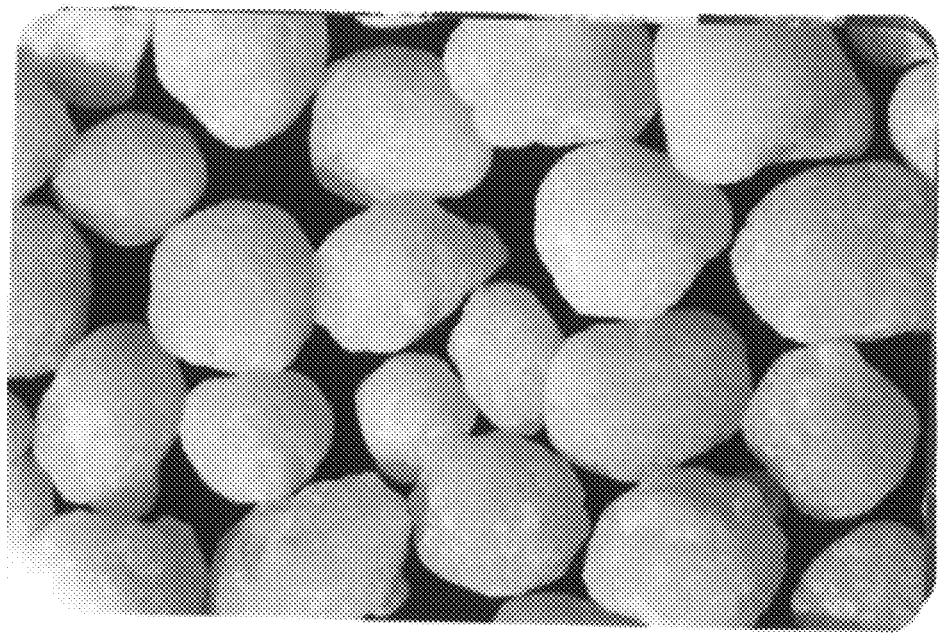
FIG. 5-8 shows granules respectively producing 1000, 2300, 3000 and 4600 mg of dust per kg of granules.
Figure 6:
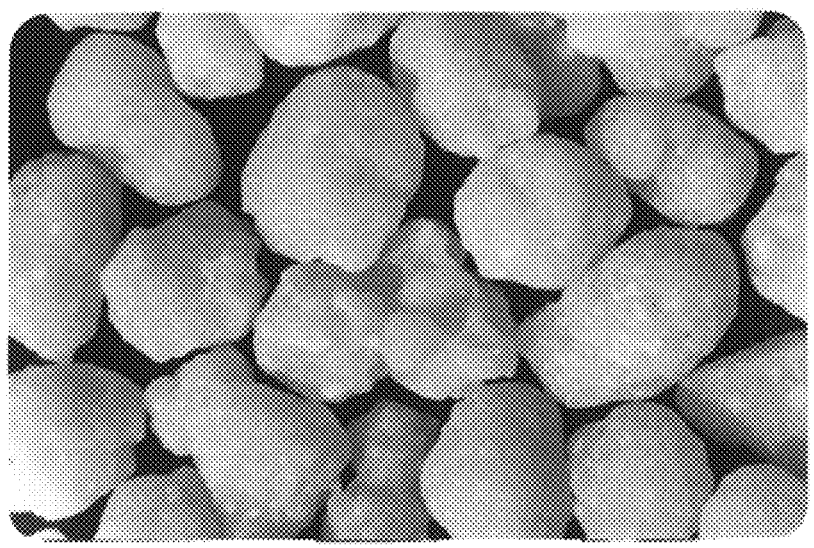
Figure 7:
Figure 8:
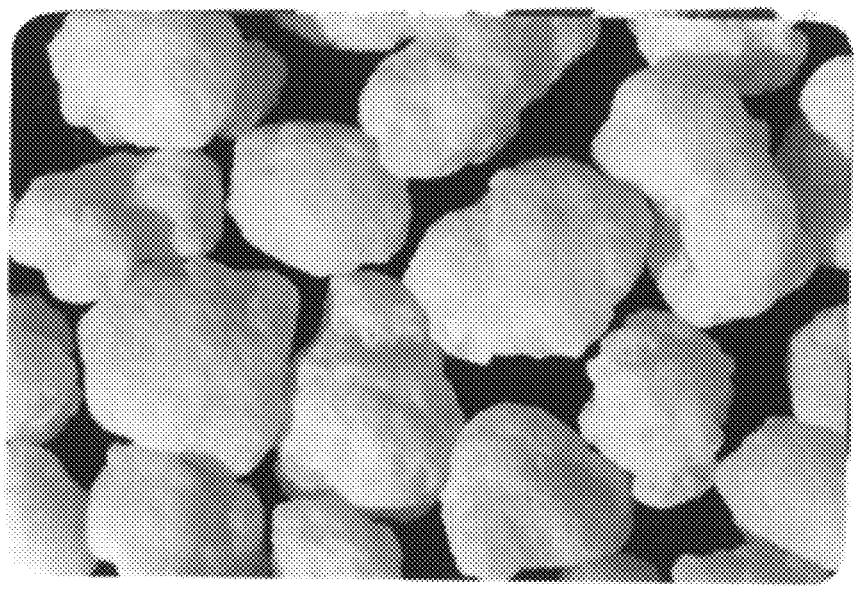

Reference is made to FIGS. 3 and 4. As illustrated in FIG. 3, a melt of a calcium nitrate mineral salt-based composition was granulated by a granulator (100) operating according to the agglomeration granulation principle, at a temperature between 90 and 95° C., as measured online by an Ircon Model 4 infrared thermometer capable of measuring temperatures ranging from 0 to 100° C., throughout the process. The granules at the outlet of granulator (100) were subsequently sent to the separator of oversized particles (200). The granules separated out by the separator of oversized particles (200), with a sieve diameter larger than 4 mm, were sent to the crusher (300) for crushing. The granules that were not separated out by the separator of oversized particles (200), with a sieve diameter smaller than 4 mm, were sent to the separator of undersized particles (400). The particles that were not separated out by the separator of undersized particles (400), with a sieve diameter larger than 2 mm, were sent to the product silo (500). The granules crushed by crusher (300), the granules separated out by the separator of undersized particles (400) were sent to the recycling silo (600). An amount of granules from the product silo (500) was further sent to the recycling silo (600) in order to maintain the level of granules in the recycling silo constant to approximately 50%. Granules from the recycling silo (600) were recycled to the granulator in an amount such that the temperature was maintained between 90 and 95° C. in the granulator (100). Dust emission measurements were performed according to the Yara YTC-LAB-132 fluidization method. FIG. 4 shows the granules obtained as the end product that have produced less than 350 mg of dust per kg of granules.

Example 4

Reference is made to FIGS. 5-8. Experiments similar to that described in Example 3 were repeated—however the recycling from the recycling silo (600—FIG. 2) was not controlled so that the temperature was not kept between 90 and 95° C. Granules of varying roundness were obtained. Dust measurements as described in Example 5 were performed for those granules of varying roundness. The granules shown in FIGS. 5, 6, 7 and 8 respectively produced 1000, 2300, 3000 and 4600 mg of dust per kg of granules. As clearly illustrated in FIGS. 4-8, the roundness of the granules decreases from FIG. 4 to FIG. 8. As the dust produced increase for the granules shown from FIG. 4 to FIG. 8, it may therefore be concluded that the rounder the granules, the less dust is produced.

Example 5: PQR—Determination of Dust Potential (Yara YTC-LAB-132 Fluidization Method)

1. Principle
1.1 Introduction

Dust particles generated during production and handling of solid fertilizers may reduce the quality of the material with respect to storage and spreading properties. The amount of free dust in a fertilizer increases during handling because of abrasion and breakdown. The dust formation may affect the caking tendency and influence the flow characteristics of the fertilizer. The dust potential as measured by the method described includes both the free dust and that generated by abrasion.

1.2 Principle and Reactions

This method specifies a method for the determination of the dust potential of solid fertilizers and is applicable to granular and prilled fertilizers. The method is designed for measurement of dust particles >150-200 μm. Dust particles which cause reduced visibility in air are too small to be determined by this method. The principle is weighing of the fertilizer before and after exposure to a flow of air in a spouting bed for a specific time. The dust potential, which is the sum of the free dust and the dust produced by abrasion, is defined as the loss in mass of a fertilizer in a spouting bed under specified conditions of time and air flow.

2. Apparatus
2.1 Required Equipment

Figure 9:
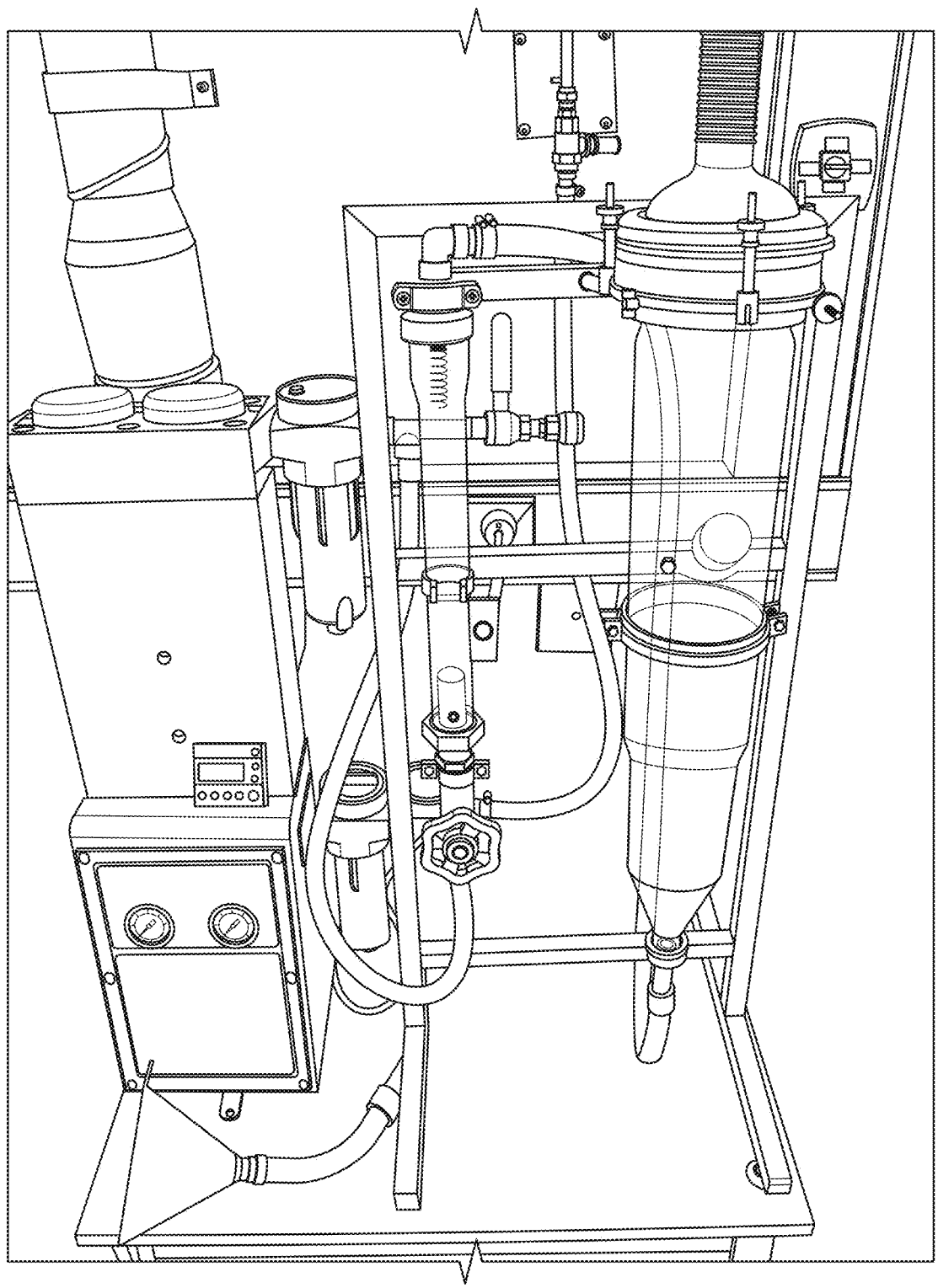
FIG. 9 shows the apparatus used in the Yara fluidization YTC-LAB-132 method used for measuring dust.
Figure 10:
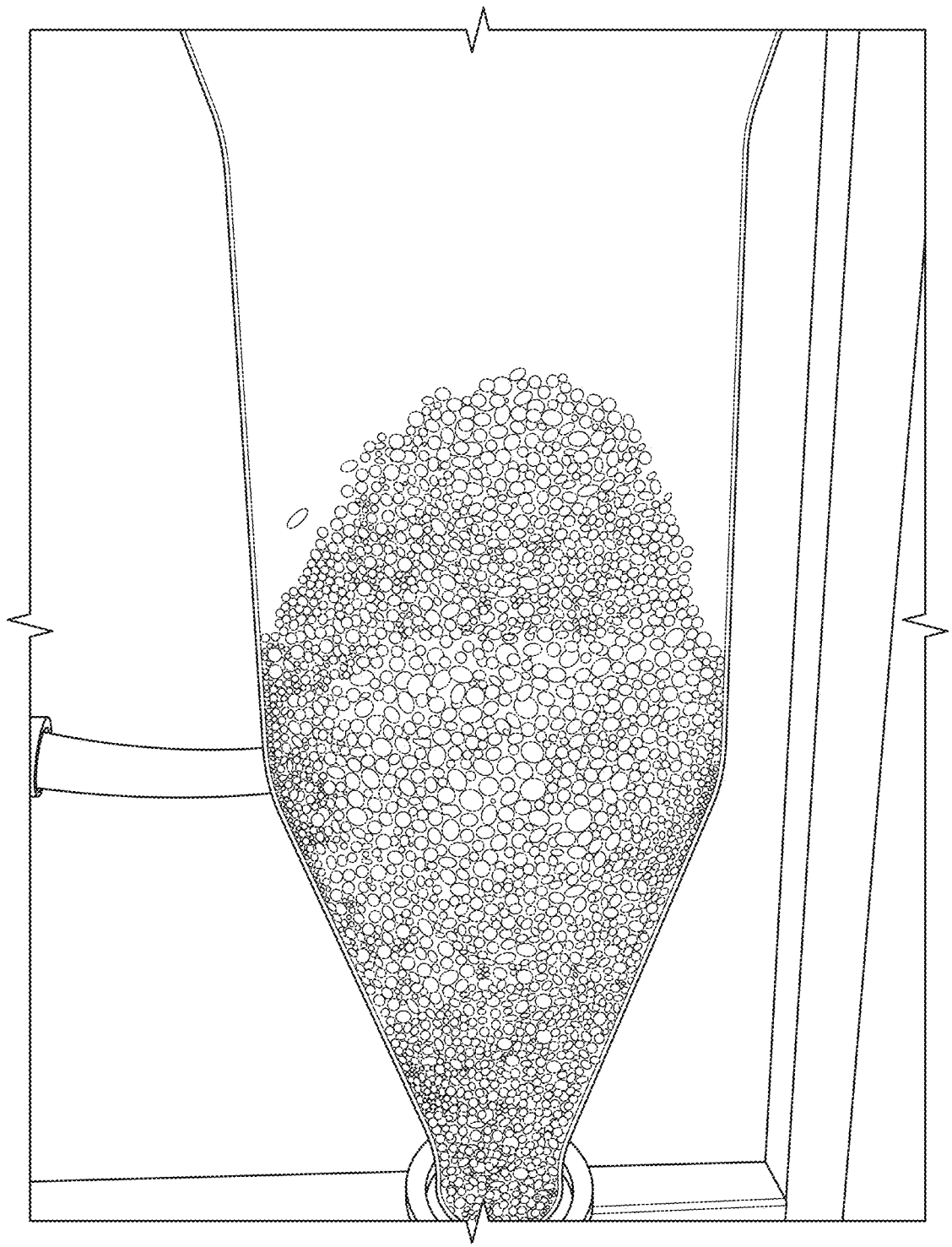
FIG. 10 shows the column of the apparatus used in the Yara fluidization YTC-LAB-132 method used for measuring dust while the apparatus is in operation.

Dust Apparatus (see FIG. 9) made up from following:
Column. The glass column has a lower spouting section ($\emptyset$=80±0.2 mm) and an upper classification section ($\emptyset$=100 mm±0.2 mm).
Glass head, mounted on top of the column with a rubber o-ring and a steel-clip.
Adapters, made of PTFE with inner diameters in the range 7-18 mm (see FIG. 10). A grid (0.5 mm) and a washer is fitted to the inlet of the adapter.
Base, made of steel.
Flowmeter, calibrated in the flow-range 15-35 $Nm^3$ air/h at ambient temperature.
Balance, accuracy±0.001 g.
Funnel, made of glass,
Spirit level
Beaker (1 liter) made of plastic or a light weight material.

2.2 Calibration

Calibration curves shall be made in the flow range 5-35 $Nm^2$ adapter/grid/washer fitted into the column. During calibration the pressure shall be measured in the air-flow downstream to the outlet valve of the flowmeter, or as close to the flowmeter as possible.

3. Procedure
3.1 Preparatory Work

Ensure that the glass parts of the column and the flowmeter are in good shape, and that pressure cannot build up in the column. If a rotameter is used, ensure that the supply pressure is below the maximum allowed working pressure for the rotameter. It is recommended that a shield of pyrex-glass is mounted between the operator and the glass tube in the rotameter.

3.2 Method

Reduce and divide the test samples to give at least three test portions of 400 g each. Avoid excessive handling which may cause abrasion of the fertilizer.
Assemble the glass column in a vertical position with the aid of a spirit-level and connect a medium adapter with the washer and the grid. Connect the flowmeter and hoses to the adapter and ensure that all connections are properly fastened.
Make sure that the flowmeter inlet valve is closed when pressurized air is supplied. The air must be dry (<500 mg water/$Nm^3$) and free from dust and hydrocarbons. Ensure that there can be no pressure build up in the apparatus.

3.2.1 Adjusting the Spouting Height

Pour one of the test portions through the side opening of the column by using the funnel. In order to prevent fertilizer grains to enter the adapter, a minor airstream can be supplied when fertilizer is added to the column.
Open the inlet valve until the flowmeter reads 25.0 $Nm^3$/h, taking care to avoid a sudden "blow up" of the fertilizer. The specified air-flow should be established within 5 seconds.
Check that the top level of the spouting fertilizer is in the range of 4-6 cm above the top level of the fertilizer (preferably 5 cm) and if this is so, close the inlet valve and empty the apparatus by removing the adapter. Replace the adapter.
Clean the column by opening the outlet valve fully, and increase the air stream to 40 $Nm^3$/h for 0.5 min by opening the inlet valve. Reduce the air stream to 25.0 $Nm^3$/h with the inlet valve and close the outlet valve.
If the spouting height is not within the specified range, choose a larger or smaller adapter as appropriate and repeat 3.2.2 Testing the Material Weigh the fertilizer sample in a container (beaker, bag etc.) to the nearest 0,001 g. Pour the sample into the column, open the flowmeter valve to obtain the right setting within 5 seconds, and blow 25.0 $Nm^3$/h of air through the column for 2 minutes. Close the valve.
Release the air hose, loosen and extract the screw cap from the adapter. Empty the fertilizer and the adapter into the container. Weigh the sample to the nearest 1/1000 g and check that the accuracy of the balance is better than 10% of the loss of weight of the sample.
NOTE: It may be helpful to weigh the adapter with the fertilizer to avoid spillages. If this is done, the adapter must be weighed separately and its mass allowed for in the final calculation.
Replace the adapter and clean the column
Repeat using another test portion.
Wash the apparatus after use with soap and water and a soft brush. Rinse thoroughly with distilled water and dry.

4. Results

The dust potential of the fertilizer, $W_d$, expressed in mg/kg, is given by the formula:

$$W_d = [(W_s - W_a)/W_s] * 10^6$$

Where:
$W_d$ is the dust potential in mg/kg
$W_s$ is the mass of the test portion in g $W_a$ is the mass of the test portion after testing in g 5. Report the Mean of the Individual Test Results to the Nearest Mg.

The invention claimed is:

1. A method for granulating a melt of an hydrous calcium nitrate mineral salt-based composition comprising from 15 to 30 weight % of water, the method comprising the steps of:
  a) granulating a melt of the nitrate mineral salt-based composition by a granulator operating according to the agglomeration granulation principle to obtain a set of granules wherein the granulator has an amount of water in a liquid phase;
  b) separating out oversized and undersized granules from the granules obtained from step a) to obtain at least a set of oversized granules, a set of undersized granules and a set of granules having a suitable size;
  c) crushing the oversized granules obtained from step b);
  d) recycling the granules obtained from step c) to the granulator;
  e) recycling the undersized granules obtained from step b) to the granulator;
  f) during step a) measuring a temperature in the granulator and
  g) based on the temperature measured in step f), adjusting the amounts of granules recycled in steps d) and/or e) so as to control the amount of water in the liquid phase and maintain the temperature measured in step f) within a range of 90 to 96° C.

2. The method according to claim 1, wherein the temperature is measured by an infrared thermometer.

3. The method according to claim 2, wherein the temperature is measured online.

4. The method according to claim 1, further comprising the step of:
  h) coating the granules obtained from the set of granules of suitable size obtained in
  b) with a coating that prevents or reduces moisture up-take.

5. The method according to claim 1, wherein the hydrous calcium nitrate mineral salt is calcium ammonium nitrate.

6. The method according to claim 1, wherein the hydrous calcium nitrate mineral salt is calcium nitrate.

7. The method according to claim 1, wherein the granulator is a pan granulator.

8. The method according to claim 1, wherein the undersized granules have a sieve diameter that is smaller than 2 mm or wherein the oversized granules have a sieve diameter that is larger than 4 mm or wherein the granules having a suitable size have a sieve diameter ranging from 2 mm to 4 mm.

9. The method according to claim 1, wherein the temperature is defined as that temperature at which neither wet granulation nor dry granulation will occur.

10. The method of claim 1 wherein the temperature measured in step f) ranges from 92 to 95° C.

11. Uncoated granules having a sieve diameter ranging from 2 mm to 4 mm, comprising an hydrous calcium nitrate mineral salt-based composition, characterized in that they produce less than 1000 mg of dust per kg of granules, determined according to the Yara YTC-LAB-132 fluidization method.

12. The uncoated granules of claim 11 characterized in that they produce less than 350 mg of dust per kg of granules.

* * * * *